United States Patent Office 2,949,733
Patented Aug. 23, 1960

2,949,733
METHOD OF OPERATING A TURBOJET ENGINE AND HIGH ENERGY FUELS USED THEREIN

Edgar E. Hardy, New Martinsville, W. Va., assignor to Monsanto Chemical Company, St. Louis, Mo., a corporation of Delaware No Drawing. Filed July 13, 1956, Ser. No. 597,573

4 Claims. (Cl. 60—35.4)

This invention relates to improved high energy fuels, and particularly aviation fuels. More specifically, it relates to fuels for aircraft turbojet and turboprop engines and to an improved method of operating such engines.

One object of the invention is to provide a hydrocarbon fuel for turbojet engines of substantially increased power output per unit volume over the hydrocarbon fuels of the prior art.

Another object of the invention is to provide a hydrocarbon fuel for jet engines having a heat of combustion of from 125,000 to 160,000 and preferably from 136,000 to 150,000 B.t.u.'s per gallon.

Another object of the invention is to provide a hydrocarbon fuel for jet engines having a pour point (ASTM D97–34) not substantially above 5° C.

An additional object of the invention is to provide a hydrocarbon fuel for jet engines having a specific gravity from 0.85/30° C. to 1.5/30° C., and preferably from 0.90/30° C. to 1.00/30° C.

A still further object of the invention is to provide a hydrocarbon fuel for jet engines which combines in a single product all of the foregoing properties.

A still further object of the invention is to provide an improved method of operating jet engines, particularly turbojet and turboprop aircraft engines.

Other objects and advantages will become apparent to those skilled in the art as the description of the invention proceeds.

Mixtures of straight-chain and/or branched chain aliphatic hydrocarbons have been and are being used as fuels for aircraft engines and while they have enjoyed a considerable amount of success, they are subject to a number of disadvantages which substantially restrict their range of utility.

One serious disadvantage of these fuels is that they have a heat of combustion of about 112,000 B.t.u. per gallon and no one has been able to improve this figure, that is, to raise it above 112,000 B.t.u. per gallon and at the same time obtain the other characteristics necessary for a jet fuel. With the current trend in aircraft design, this presents a problem as to the use of such fuels in military or commercial aircraft. For example, aircraft generally, and particularly military aircraft, are being designed for higher and higher speeds. Accordingly, the wing sections are getting thinner and thinner and there is increasingly less space for storage of fuel in the wings. Consequently, these fuels are being stored in the fuselage of such aircraft. This presents a safety hazard and also a problem of maintaining the center of gravity of such aircraft and, therefore, specially designed equipment is installed to automatically and continuously alternate the use from one tank to another to maintain the center of gravity.

Another disadvantage of these fuels is that they have high vapor pressures and tend to flash off rapidly as the aircraft gains altitude. This can be overcome by pressurizing the fuel tanks, but if this is done, it is necessary to increase their structural strength which means adding weight to the aircraft. Moreover, in the case of self-sealing tanks, pressurizing does not satisfactorily solve the problem since this causes loss of protection from the self-sealing action.

It has been found that motor fuels which are free of the above described disadvantages may be prepared by hydrogenating a dimer of an α-alkyl styrene, which structurewise may be represented as

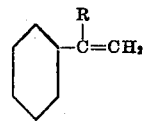

where R is an alkyl radical containing 1 to 4 carbon atoms, until its specific gravity is decreased to a value in the range of about 0.85 to about 1.5 and preferably in the range of about 0.90 to about 1.0 at 30° C. Stated in a somewhat different manner, the dimer or mixtures of dimers of α-alkyl styrene are hydrogenated until the heat of combustion attains a value of about 125,000 to about 160,000, and preferably about 136,000 to about 150,000 B.t.u. per gallon. The products thus obtained are partially or substantially completely hydrogenated depending upon the degree of unsaturation of the particular unsaturated hydrocarbon mixture employed.

As an alternative to the foregoing method, partially and/or substantially completely hydrogenated α-alkyl styrene dimers may be blended to yield a hydrocarbon mixture which meets the above specifications with respect to specific gravity and heat of combustion.

As illustrative of this invention but not limitative thereof is the following:

Example 240 grams of an isomeric mixture of α-methylstyrene dimers were melted and mixed with the nickel obtained from the decomposition of 50 grams of nickel formate. The resulting product was hydrogenated for 6¾ hours at pressures between 500 and 710 p.s.i.g. at a temperature within the range of about 90° C. up to about 240° C. The hydrogenation product was a clear liquid having the following properties:

Specific gravity at 30° C. _____ 0.942.
Heat of combustion _____ 140,400 B.t.u./gal.
Pour point _____ −17.8° C.
Flash point (ASTM D92–33) _____ 157.2° C.
Flame point (ASTM D92–33) _____ 160° C.
Distillation range _____ 301° C.–315° C./ 760 mm.

The products of the instant invention are characterized by having the following combination of properties which render them eminently suitable for use as high energy fuels for aircraft engines, and particularly for turbojet engines:

(1) A heat of combustion within the range of 125,000 to 160,000 B.t.u. per gallon
(2) A specific gravity at 30° C. in the range of 0.85 to 1.5
(3) Low vapor pressure or high boiling point
(4) Low viscosity
(5) Low pour point
(6) Substantially no sulfur or vanadium compounds
(7) No water
(8) Burn cleanly without substantial formation of solid combustion products
(9) Uniform materials with relatively narrow boiling range

(10) Substantially free from straight chain and/or branched chain aliphatic hydrocarbons except when blended with other materials in the manner subsequently described
(11) Substantially non-corrosive
(12) Substantially non-gum forming Moreover, it will be noted from the foregoing example that the products of this invention are markedly superior to the aliphatic hydrocarbon turbojet fuels of the prior art in that the former in many instances have lower vapor pressures and in all instances substantially higher heats of combustion than the latter. Therefore, the products of this invention are in many cases more suitable for high altitude flying and, at the same time, provide in all cases the same energy output with a smaller volume of fuel than the aliphatic hydrocarbon turbojet fuels, thus substantially eliminating the fuel storage problem and its attendant disadvantages. In addition, in many instances, the fuels of the instant invention have low pour points equivalent to or lower than present aliphatic hydrocarbon turbojet fuels and hence provide another important advantage over the latter from the standpoint of cold weather and high altitude flying.

The products of this invention essentially comprise partially to substantially completely hydrogenated α-alkyl styrene dimers in which the phenyl radicals are preferably joined to each other by aliphatic radicals containing at least one carbon atom. However, it is also within the broad scope of the invention to include in these products small amounts of hydrogenated α-alkyl styrene dimers in which the phenyl radicals are joined to each other by aliphatic radicals containing from 2 to about 8 carbon atoms so long as the specific gravity and heat of combustion of the product are not reduced below 0.85/30° C. and 125,000 B.t.u. per gallon, respectively.

The fuels of the instant invention are eminently suitable for use in jet engines, particularly turbojet and turboprop aircraft engines.

In the operation of turbojet engines, air is withdrawn from the atmosphere into an air compressor, compressed and delivered to the combustion chamber of the engine where it is mixed with these fuels and the product ignited. The resulting burning mixture of fuel and air is diluted with secondary air and expanded through a turbine which drives the air compressor. In these engines, the hot mixture is expanded in the turbine in such a manner that only sufficient energy is extracted from the gases to operate the compressor. The remaining energy is employed to eject the gases in jet form through a jet pipe into the atmoshpere and thereby produce thrust.

In using these fuels in turboprop engines, the operation is essentially the same except that the gases are almost completely expanded in the turbine, i.e., they are expanded almost down to the pressure of the surrounding atmosphere, leaving only a relatively small amount of energy to produce thrust when ejected through the jet pipe. Thus, in turboprop engines the majority of the energy from the hot expanding gases is used to operate the compressor and the propeller and hence the thrust is obtained primarily from the latter.

In many turbojets and turboprop engines, only a single stage turbine is employed. However, more than a single stage may be employed and, if so, guide vanes are introduced between each pair of turbine wheels. After leaving the last turbine wheel, the gas enters the jet pipe and is discharged therefrom into the atmosphere.

In the operation of these engines using the fuels of the instant invention, the fuel and air are charged into the combustion chamber in an initial weight ratio of fuel to air which is substantially in the range of about 0.06 to about 0.11, the particular ratio selected being dependent upon the power requirements at the moment. This mixture is supplemented by secondary air in an amount providing an over-all fuel to air weight ratio which does not substantially exceed 0.02 at the entrance to the turbine wheel. Fuel/air weight ratios substantially higher than 0.02 are not desirable since they result in the production of temperatures which cannot be tolerated by turbines with present materials of construction.

The use of any of the products described herein provides a new method of operating jet engines having all of the advantages over prior jet fuels which are set forth earlier herein.

The fuels of the instant invention may be used advantageously in the spark ignition piston-type aircraft engine, diesel engines, and turbine engines generally, but are particularly suitable for use in ram jet, turbojet and turboprop aircraft engines. However, when the piston-type and diesel engines are employed, the fuel/air ratios are adjusted so as to achieve substantially complete combustion of the air and fuel which means that these ratios fall within the limits of about 0.045 to about 0.110 and preferably within the limits of about 0.066 to about 0.08.

The fuels of the instant invention may be blended with other materials such as gasoline, kerosene, mixtures of gasoline and kerosene, other aviation fuels, and with present hydrocarbon jet fuels to produce an improved fuel over the presently available fuel. More particularly, the fuels described herein may be added to the present aliphatic hydrocarbon jet fuels having a heat of combustion of about 112,000 B.t.u. per gallon to raise the over-all heat of combustion thereof to at least about 120,000 B.t.u. or 125,000 per gallon. Moreover, the fuels described herein may be used in combination with fuel additives to obtain improved results as regards burning characteristics, etc.

The heat of combustion as given in this specification represents the heat of reaction between gaseous oxygen and liquid hydrocarbon to produce gaseous carbon dioxide and water.

While this invention has been described with respect to certain embodiments, it is not so limited and it is to be understood that variations and modifications thereof which are obvious to those skilled in the art may be made without departing from the spirit or scope of this invention.

This application is a continuation-in-part of U.S. application Serial Number 316,312, filed October 22, 1952, of E. W. Gluesenkamp and Milton Kosmin, now U.S. Patent No. 2,765,617.

What is claimed is:

1. A method of operating a turbojet engine which comprises feeding a mixture of air and a partially hydrogenated polycyclic hydrocarbon mixture having a specific gravity of from about 0.85 at 30° C. to about 1.5 at 30° C., a pour point not substantially above 5° C., and a heat of combustion of at least 125,000 B.t.u. per gallon into the combustion chamber of said engine, subjecting the said mixture to combustion, passing the resulting hot gases through a turbine to expand the same and then passing the hot gases into the atmosphere by way of a nozzle, whereby thrust is produced, the said hydrogenated polycyclic hydrocarbon mixture being that obtained upon partial hydrogenation under heat and pressure in the presence of a catalyst, of a dimer of an α-alkyl styrene of the structure

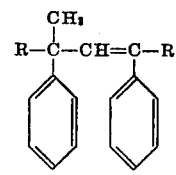

wherein R is an alkyl group which contains from 1 to 4 carbon atoms inclusive.

2. The method of claim 1 wherein the partially hydrogenated polycyclic hydrocarbon mixture is the partially hydrogenated dimer of α-methyl styrene.

3. A partially hydrogenated polycyclic hydrocarbon mixture having a specific gravity of from about 0.85 at 30° C. to about 1.5 at 30° C., a pour point not substantially above 5° C., and a heat of combustion of at least 125,000 B.t.u. per gallon, the said hydrogenated polycyclic hydrocarbon being obtained by the partial hydrogenation under heat and pressure in the presence of a catalyst, of a dimer of an α-alkyl styrene of the structure

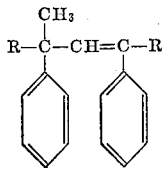

wherein R is an alkyl group which contains from 1 to 4 carbon atoms inclusive.

4. A partially hydrogenated polycyclic hydrocarbon mixture having a specific gravity of from about 0.85 at 30° C. to about 1.5 at 30° C., a pour point not substantially above 5° C., and a heat of combustion of at least 125,000 B.t.u. per gallon, the said hydrogenated polycyclic hydrocarbon being obtained by the partial hydrogenation of a dimer of an α-methyl styrene under heat and pressure and in the presence of a catalyst.

References Cited in the file of this patent
UNITED STATES PATENTS

| | | |
|---|---|---|
| 2,623,078 | Bewley et al. | Dec. 23, 1952 |
| 2,646,450 | Thurber | July 21, 1953 |
| 2,712,497 | Fox et al. | July 5, 1955 |
| 2,749,225 | Barnum et al. | June 5, 1956 |
| 2,765,617 | Gluesenkamp et al. | Oct. 9, 1956 |

OTHER REFERENCES

Fieser et al.: "Organic Chemistry," D. C. Heath & Co. (1944), page 917.

Boundy et al.: "Styrene, Its Polymers, Copolymers and Derivatives," page 689, Reinhold Publ. Co., New York, N.Y. (1952).